Patented Feb. 13, 1945

2,369,495

UNITED STATES PATENT OFFICE 2,369,495

TREATMENT OF AROMATIC HYDROCARBONS

Louis Schmerling and Vladimir N. Ipatieff, Chicago, Ill., assignors to Universal Oil Products Company, Chicago, Ill., a corporation of Delaware No Drawing. Application March 24, 1941, Serial No. 384,950

8 Claims. (Cl. 260—671)

This invention relates to the treatment of aromatic hydrocarbons to produce methylated and poly-methylated aromatic hydrocarbons. More specifically the process is concerned with the conversion of benzene into toluene and poly-methylated benzenes in the presence of a granular catalyst.

It is recognized that benzene has been converted into toluene and other methylated benzenes by treatment with methanol in the presence of a relatively large proportion of aluminum chloride. This reaction has certain disadvantages, particularly the fact that a complex addition compound is formed which involves the aluminum chloride, produces sludge-like material, and prevents continuous operation of the process. When employing this type of operation it is necessary to use a higher molecular proportion of aluminum chloride than methanol since substantially no methylation occurs when equal molecular proportions of methanol and aluminum chloride are employed. A study of the reaction indicates that at least 1 molecular proportion of aluminum chloride reacts with the methanol as a chemical reagent and not as a true catalyst. The present invention is different from the prior art on this subject in that the methylation reaction is effected in the presence of a true catalyst, namely, zinc chloride.

In one specific embodiment the present invention comprises a process for producing methylated aromatic hydrocarbons which comprises contacting an aromatic hydrocarbon with methanol under methylating conditions in the presence of zinc chloride-containing catalyst.

While the process of this invention is particularly applicable to the production of toluene from benzene, it may also be utilized for converting other aromatic hydrocarbons into methylated and poly-methylated aromatic hydrocarbons. Thus aromatic hydrocarbons which may be methylated under suitable operating conditions include benzene, toluene, other alkylated benzenes, naphthalene, alkylated naphthalenes, and other polynuclear aromatic hydrocarbons obtainable by the distillation of coal, by the dehydrogenation of naphthenes, by the dehydrogenation and cyclization of aliphatic hydrocarbons as well as the alkylation of alkylated aromatic hydrocarbons, and by other means.

Methanol, employed in the process, may be obtained by the distillation of wood, it may be produced synthetically from carbon monoxide and hydrogen, or formed by oxidation of hydrocarbons. Other suitable methylating agents include methyl ethers, methyl esters, and other methoxy-containing organic compounds capable of reacting with aromatic hydrocarbons to yield substantial proportions of methylated aromatic hydrocarbons in the presence of the catalysts hereinafter set forth.

When the methylating agent employed consists of a compound containing methoxy groups as an alcohol, ether, or ester, intermediate formation of hypothetical methylene, $=CH_2$, may occur and serve as the active methylating agent. Thus water may be split from an alcohol or an ether forming methylene, or this hypothetical substance may arise by the splitting of an organic acid from a methyl ester of said acid. For convenience, methylene may herein be considered as the first member of the olefin series which undergoes reaction for example with benzene to produce toluene and also poly-methyl benzenes, and with other aromatic hydrocarbons to form other methylated aromatic hydrocarbons. These different methylating agents, however, are not necessarily used under the same conditions of operation to form desired products.

Zinc chloride employed as methylating catalyst may be used as such, in solid or molten state, as an aqueous solution, or preferably composited with a carrier. These different forms in which zinc chloride-containing materials may be employed are not necessarily equivalent in their action. Zinc chloride upon a support, and preferably upon one containing alumina, may be formed into particles or granules suitable for use as a reactor filling material through which a mixture of an aromatic hydrocarbon and methanol or other suitable methylating agent may be passed in order to form substantial proportions of methylated aromatic hydrocarbons.

The preferred catalyst for use in effecting the process of the present invention comprises essentially a composite of zinc chloride and a carrier, preferably alumina or a material containing alumina or composited with a substantial proportion of alumina. Other substances which may be employed as carriers for zinc chloride comprise charcoal, pumice, crushed firebrick, crushed porcelain, siliceous material as diatomaceous earth, etc. The different carriers which may be employed are not necessarily equivalent in their action and the conditions of operation may be modified accordingly depending upon the activities of the catalysts formed from said carriers and added zinc chloride.

The proportions of carrier and zinc chloride may be varied as desired to make catalyst composites of different activities. Thus it has been found possible and practical to make stable granular catalysts resistant to disintegrating influences by using from about 5 to about 50% by weight of zinc chloride and from about 95 to about 50% by weight of activated alumina. These materials in finely powdered form, after thorough mechanical mixing, are subjected to drying, pelleting, and heating or calcining operations to produce formed particles of catalyst suitable for use as reactor filling material. A suitable carrier may also be impregnated with an aqueous solution of zinc chloride and dried to form a zinc chloride-carrier composite suitable for use in promoting the conversion of an aromatic hydrocarbon into methylated aromatic hydrocarbons. The catalyst compositions indicated in the specification and claims are shown in terms of the proportions of the materials from which these catalyst composites are prepared rather than their exact compositions which may be somewhat different due to formation of some zinc hydroxychloride, zinc oxychloride, or other material resulting from hydrolysis or partial hydrolysis of zinc chloride or to other conversions which are not clearly understood.

Methylation of aromatic hydrocarbons of the types hereinabove set forth are also carried out in the presence of hydrogen or of a hydrogen-containing gas. There is less formation of carbon and heavy hydrocarbonaceous material upon the catalyst when these conversion reactions are carried out under hydrogen pressure but carbon formation does occur to a substantial extent in the absence of added hydrogen.

Methyl ether generally appears as a by-product of the methylation of benzene with methanol in the presence of a zinc chloride-containing catalyst. Considerations relating to the mechanism of the methylation of benzene with methanol indicates that the reaction should proceed almost as readily with dimethyl ether as with methanol. A number of the reactions which are apparently involved in the process of the present invention are illustrated by the following equations which should not be misconstrued as limiting the broad scope of the invention:

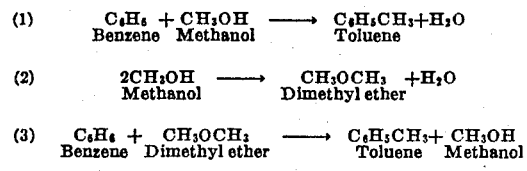

It is thus likely that methyl ether formed during methylation of benzene may react with benzene to produce toluene or more-highly methylated benzenes. It is probable that increase in toluene yield would be obtained in the reaction of benzene with methyl ether if hydrogen chloride, or a substance capable of producing hydrogen chloride, were added to such a reaction mixture.

In effecting reaction between benzene or another aromatic hydrocarbon and a methylating agent as methanol according to the process of the present invention, the exact method of procedure varies with the nature of the reacting constituents as well as with the composition and activity of the catalyst employed. A simple procedure which is used in methylating benzene consists in contacting a mixture of benzene and methanol with a zinc chloride-carrier composite at a temperature of from about 150° to about 450° C. and preferably from about 250° to about 400° C. under a pressure of from substantially atmospheric to approximately 300 atmospheres although higher pressures may also be employed. The adsorptive properties of some of the carriers employed tend to retard loss of zinc chloride from such catalyst composites when used at relatively high temperatures within the above indicated limits. Intimate contact of the reacting components with the catalyst is effected by passing the reaction mixture over a fixed bed of the granular zinc chloride-containing catalyst or the reacting components may be mixed with finely diivded or powdered catalyst in a substantially fluid type of operation. The reaction mixture undergoing treatment preferably contains between about 1 and about 20 molecular proportions of benzene, or other aromatic hydrocarbon per molecular proportion of methanol or other methylating agent in order to diminish production of poly-methylated hydrocarbons and to favor the production of toluene or of other mono-methyl compounds when an aromatic hydrocarbon other than benzene is similarly treated.

Thus benzene and methanol are commingled and passed through a reactor containing the granular catalyst such as a composite of zinc chloride and alumina, or at least a portion of the benzene is charged to a reactor while the methanol as such or preferably diluted by another portion of the benzene being treated, is introduced at various points betwen the inlet and the outlet of the reaction zone in such a way that the reaction mixture being subjected to contact with the granular zinc chloride-containing catalyst contains at all times relatively low proportion of methanol and thus favors production of toluene rather than the formation of more-highly methylated aromatic compounds.

While the method of passing a methylating agent such as methanol and benzene or other aromatic hydrocarbon, either together or concurrently, through a suitable reactor containing a fixed bed of granular catalyst is generally customary procedure, the interaction of methanol and an aromatic hydrocarbon may also be effected in batch type operation utilizing a closed vessel in which some of the reacting constituents are in liquid phase and in which the catalyst is present preferably in finely divided form and is maintained in dispersion or suspension by some means of agitation. Reacting constituents may also be contacted with the catalyst in mixed phase to effect a similar type of reaction. The choice of operating procedure is dependent upon such circumstances as the temperature and pressure found to be most effective for producing the desired reaction between a particular aromatic hydrocarbon and a methylating agent such as methanol.

A composite of zinc chloride on a carrier is a preferred catalyst for the present process as it permits continuous conversion of benzene into toluene or other methylated benzenes in the presence of a fixed catalyst and thus avoids mechanical problems and other difficulties encountered when this conversion reaction is carried out in the presence of aluminum chloride which has a tendency to form complex addition compounds with aromatic hydrocarbons and thus to produce sludge-like material which decreases the active life of the aluminum chloride and also prevents continuous operation.

In general the products formed by interaction of methanol with a molal excess of an aromatic hydrocarbon are separated from the unreacted aromatic hydrocarbon by suitable means as by distillation and the unreacted portion of the aromatic hydrocarbon originally charged and methyl ether which may be formed from methanol are returned to the process and commingled with additional quantities of the mixture of methanol and aromatic hydrocarbon being charged to contact with the catalyst. Thus the methylated aromatic hydrocarbons may be freed from the excess of the originally charged aromatic hydrocarbon and then be separated into desired fractions or individual compounds by distillation at ordinary or reduced pressure or by other suitable means.

An important feature of this invention is the use of hydrogen chloride as promoter to assist in the production of methylated aromatic hydrocarbons. In a particular batch type of operation, less than 7% of methylated benzene was obtained when 1 molecular proportion of benzene was treated with 0.6 molecular proportion of methanol at 350° C. in the presence of a composite of 25% by weight of zinc chloride and 75% by weight of alumina and under a superatmospheric hydrogen pressure. When 2% by weight of hydrogen chloride was added to the benzene-methanol mixture and the reaction was carried out under the aforementioned conditions, yields of 25% by weight of toluene and 19% of xylenes were produced based upon the theoretical yield obtainable from the methanol charged. Other materials utilizable as promoters of the methylation of aromatic hydrocarbons by methanol include hydrogen bromide, hydrogen fluoride, methyl bromide, methyl chloride, halogens, etc. In general, substances such as chlorine and alkyl halides undergo conversion reactions in the presence of supported zinc chloride under the operating conditions employed to produce hydrogen chloride or another hydrogen halide which presumably functions as the methylation promoter.

Other catalysts suitable for promoting the process are of the Friedel-Crafts type and include chlorides of tin, zirconium, iron, etc. The process of this invention may also be applied to the alkylation of aromatic hydrocarbons with ethanol or with other primary alcohols which ordinarily react with difficulty with aromatic hydrocarbons.

The following examples are given to illustrate the character of results obtained by the use of the present process, although the data presented are not introduced with the intention of unduly limiting the generally broad scope of the invention:

EXAMPLE I

Very little reaction occurred when 80 parts by weight of benzene, 20 parts by weight of methanol, and 15 parts by weight of a composite of 25% by weight of zinc chloride and 75% by weight of alumina were heated in an autoclave for 4 hours at 250° C. in the presence of hydrogen under a maximum pressure of 193 atmospheres. A small amount of water was formed and a mixture was recovered which contained less than 2% of material boiling above benzene. More reaction occurred when similar proportions of benzene, methanol, and the above indicated catalyst were heated for 4 hours at 350° C. in the presence of hydrogen under a maximum pressure of 263 atmospheres, and about 7% by weight of toluene was obtained, this aromatic hydrocarbon being identified by nitration to 2,4-dinitrotoluene with a melting point of 68° C. Methyl ether was formed in about a 10% yield at 250° C. and to the extent of about 30% at 350° C.

EXAMPLE II

A number of runs was made in which 80 parts by weight of benzene, 20 parts by weight of methanol, and 15 parts by weight of the catalyst used in Example I were contacted for 4 hours at 350° C. In each run the autoclave containing the above indicated reactants was also charged with hydrogen to an initial pressure of 100 atmospheres. Some of the runs were made in the presence of hydrogen chloride or methyl chloride added in amounts indicated in Table I which also shows the resulting yields of toluene and xylenes.

TABLE I

*Methylation of benzene with methanol in batch operation*

| Run No. | Addition to charge, parts by weight | | Yield, percent of theoretical | | | Ratio of toluene to other methyl benzenes |
|---|---|---|---|---|---|---|
| | Hydrogen chloride | Methyl chloride | Toluene | Xylenes | Total methyl benzenes | |
| 1 | 3 | 0 | 24 | 19 | 67 | 0.56 |
| 2 | 9 | 0 | 20 | 14 | 63 | 0.47 |
| 3 | 0 | 3 | 18 | 20 | 62 | 0.41 |
| 4 | ¹3 | 0 | | | 9 | |

¹ Concentrated hydrochloric acid (aqueous solution).

The above results show that good yields of toluene and other methyl benzenes are obtainable by reacting benzene with methanol in the presence of zinc chloride-alumina catalyst provided that hydrogen chloride or a potential source of hydrogen chloride is present such as methyl chloride. The presence of relatively large quantities of hydrogen chloride appears to be unnecessary as nearly the same yields of methylated benzene were obtained when the hydrogen chloride added amounted to about 12 or 36 mole per cent of the methanol charged, namely 3 and 9 parts by weight of hydrogen chloride, respectively, per 20 parts by weight of methanol. Approximately half of the methylated product was higher boiling than toluene and even included crystalline hexamethylbenzene. As at 350° C., about 9% of total methylated products were also obtained when a mixture of benzene, methanol, and concentrated aqueous hydrochloric acid was heated at 400° C. in the presence of the zinc chloride-alumina catalyst.

EXAMPLE III

A mixture of 1.9 molecular proportions of benzene, 1 molecular proportion of methanol, and 0.04 molecular proportion of methyl chloride, thus containing about 21.7% by weight of methanol, was passed during periods of 1 hour each through a steel reactor surrounded by a heating furnace and containing 46 to 48 parts by weight (40 volumes) of a catalyst formed by compositing 25% by weight of zinc chloride and 75% by weight of alumina. Before the indicated reaction mixture was charged, the reaction system was brought up to the operating pressure of 21 atmospheres by introduction of hydrogen. Table II shows results obtained in a number of runs made at different temperatures and charging rates, indicated in terms of space velocity, which is an expression herein used for referring to the volumes of total liquid charge (measured at ordinary temperature) passed per hour through unit volume of catalyst.

TABLE II

Continuous methylation of benzene with methanol

| Run No. | Temperature, °C. Catalyst Max. | Temperature, °C. Catalyst Final | Temperature, °C. Furnace | Space velocity | Yield, per cent of theoretical based upon methanol and methyl chloride Toluene | Yield, per cent of theoretical based upon methanol and methyl chloride Xylenes | Yield, per cent of theoretical based upon methanol and methyl chloride Total methylated benzenes | Ratio of toluene to poly-methyl benzenes | Carbonaceous deposit, wt. per cent of catalyst |
|---|---|---|---|---|---|---|---|---|---|
| 1 | 304 | 300 | 300 | 4 | --- | --- | 5 | --- | 3.5 |
| 2 | 365 | 354 | 351 | 2 | 15 | 14 | 64 | 0.31 | 1.5 |
| 3 | 375 | 347 | 347 | 4 | 11 | 5 | 35 | 0.46 | 6.7 |
| 4 | 417 | 404 | 400 | 2 | 16 | 16 | 60 | 0.36 | 5.7 |
| 5 | 431 | 400 | 403 | 4 | 13 | 11 | 42 | 0.45 | |

Very little methylation occurred at 300° C. with a space velocity of 4. At both 350° and 400° C. (furnace temperatures) toluene was obtained in 15 to 16% yields at a space velocity of 2 and in 11 to 13% yields with a space velocity of 4.

The methylation reaction was highly exothermic as evidenced by the fact that the catalyst temperature at the beginning of the run increased as much as 25 to 30° C. above the furnace temperature. The catalyst temperature later dropped and thus indicated that methylation was taking place more slowly but at this lower rate of methylation a substantial proportion of the methanol was converted into methyl ether.

EXAMPLE IV

A 5% yield of toluene and a 17% yield of total methyl benzenes were obtained when the reaction mixture shown in Example III was passed over a composite of 25% by weight of zinc chloride and 75% by weight of diatomaceous earth (formed particles) using a furnace temperature of 356° C. and a liquid space velocity of 1.5. Methyl ether was also formed in small amounts at the beginning of the run.

EXAMPLE V

A mixture of 1.9 molecular proportions of benzene, 1 molecular proportion of methanol, and 0.04 molecular proportion of methyl chloride, containing 21.7% by weight of methanol was passed through a steel reactor containing from 45.8 to 47.0 grams (40 cubic centimeters) of the zinc chloride on alumina catalyst indicated in Examples I to III. The mixture of liquid reactants was charged at a rate corresponding to a liquid space velocity from 0.6 to 3.9 while hydrogen was introduced simultaneously. Results obtained in a number of runs at different temperatures with several proportions of hydrogen under a pressure of 1000 pounds per square inch (about 69 atmospheres) are shown in Table III which also gives other results obtained in the absence of added hydrogen. In the latter cases the reaction system was initially pressured with nitrogen.

TABLE III

Continuous methylation of benzene with methanol

| Run No. | Temperature, °C. Catalyst Max. | Temperature, °C. Catalyst Final | Temperature, °C. Furnace | Space velocity | Effluent gas, cu. ft./hr. | Yield, percent of theoretical based upon methanol and methyl chloride Toluene | Yield, percent of theoretical based upon methanol and methyl chloride Xylenes | Yield, percent of theoretical based upon methanol and methyl chloride Total methylated benzenes | Ratio of toluene to poly-methyl benzenes | Carbonaceous deposit, wt. percent of catalyst at end of run |
|---|---|---|---|---|---|---|---|---|---|---|
| HYDROGEN PASSED CONTINUOUSLY ||||||||||||
| 1-A [1] | 367 | 352 | 357 | 0.6 | 0.32 | 22 | 25 | 104 | 0.24 | |
| 1-D | 359 | 357 | 355 | 1.0 | 0.32 | 12 | 17 | 65 | 0.23 | 0.25 |
| 2-I [2] | 371 | 358 | 349 | 2.2 | 0.58 | 13 | 15 | 63 | 0.26 | |
| 2-II | 358 | 353 | 348 | 2.0 | 0.35 | 12 | 11 | 68 | 0.21 | 0.32 |
| 3-I | 365 | 343 | 346 | 3.9 | 0.31 | 15 | 16 | 77 | 0.24 | |
| 3-II | 343 | 355 | 346 | 3.8 | 0.39 | 9 | 6 | 35 | 0.23 | 0.54 |
| NITROGEN PRESSURE AT BEGINNING OF RUN ONLY ||||||||||||
| 4-I | 316 | 299 | 303 | 2.1 | 0.11 | 5 | 6 | 28 | 0.22 | |
| 4-II | 299 | 299 | 302 | 2.0 | 0.04 | --- | --- | 8 | --- | 0.42 |
| 5-I | 371 | 351 | 347 | 2.1 | 0.18 | 12 | 12 | 61 | 0.24 | |
| 5-II | 351 | 351 | 347 | 2.0 | --- | 9 | 11 | 59 | 0.18 | |
| 5-IV | 349 | 347 | 347 | 2.0 | 0.15 | --- | --- | 8 | --- | 3.32 |

[1] Letters refer to periods of two hours duration.
[2] Roman numerals refer to periods of one hour duration.

The continuous addition of hydrogen to the mixture being subjected to methylating treatment had a beneficial effect in increasing the catalyst life and in decreasing the rate of carbon formation thereon. In these runs the yield ratio of toluene to more-highly methylated products, including hexamethylbenzene, was low but varied over a rather narrow range of from about 0.18 and about 0.26.

The nature of the present invention and its commercial utility can be seen from the specification and examples given, although neither section is intended to limit its generally broad scope.

We claim as our invention:

1. A process for producing methylated aromatic hydrocarbons which comprises contacting an aromatic hydrocarbon with a methoxy-containing organic compound at a temperature of from about 150° to about 450° C. in the presence of a catalyst comprising essentially a composite of zinc chloride and alumina.

2. A process for producing methylated aromatic hydrocarbons which comprises contacting an aromatic hydrocarbon with a methoxy-containing organic compound at a temperature of from about 150° to about 450° C. under a pressure of from substantially atmospheric to approximately 300 atmospheres in the presence of a hydrogen halide and of a catalyst formed by compositing between about 5 and about 50% by weight of zinc chloride with between about 95 and about 50% by weight of alumina.

3. A process for producing methylated aromatic hydrocarbons which comprises contacting an aromatic hydrocarbon with methanol at a temperature of from about 150° to about 450° C. under a pressure of from substantially atmospheric to approximately 300 atmospheres in the presence of a hydrogen halide and of a catalyst formed by compositing between about 5 and about 50% by weight of zinc chloride with between about 95 and about 50% by weight of alumina.

4. A process for producing methylated aromatic hydrocarbons which comprises contacting an aromatic hydrocarbon with a methyl ether at a temperature of from about 150° to about 450° C. under a pressure of from substantially atmospheric to approximately 300 atmospheres in the presence of a hydrogen halide and of a catalyst formed by compositing between about 5 and about 50% by weight of zinc chloride with between about 95 and about 50% by weight of alumina.

5. A process for producing a substantial yield of toluene from benzene which comprises contacting said benzene with a methoxy-containing organic compound at a temperature of from about 150° to about 450° C. under a pressure of from substantially atmospheric to approximately 300 atmospheres in the presence of a hydrogen halide and of a catalyst formed by compositing between about 5 and about 50% by weight of zinc chloride with between about 95 and about 50% by weight of alumina.

6. A process for producing a substantial yield of toluene from benzene which comprises contacting said benzene with methanol at a temperature of from about 150° to about 450° C. under a pressure of from substantially atmospheric to approximately 300 atmospheres in the presence of a hydrogen halide and of a catalyst formed by compositing between about 5 and about 50% by weight of zinc chloride with between about 95 and about 50% by weight of alumina.

7. A process for producing a substantial yield of toluene from benzene which comprises contacting said benzene with a methyl ether at a temperature of from about 150° to about 450° C. under a pressure of from substantially atmospheric to approximately 300 atmospheres in the presence of a hydrogen halide and of a catalyst formed by compositing between about 5 and about 50% by weight of zinc chloride with between about 95 and about 50% by weight of alumina.

8. A process for producing methylated aromatic hydrocarbons which comprises reacting an aromatic hydrocarbon with a methoxy-containing organic compound under methylating conditions in the presence of a catalyst comprising essentially zinc chloride and alumina.

LOUIS SCHMERLING.
VLADIMIR N. IPATIEFF.